Jan. 15, 1935. T. B. PRICKETT 1,987,911
TEMPERATURE REGULATION OF CONTACT MASSES
Filed Dec. 30, 1932 2 Sheets-Sheet 1
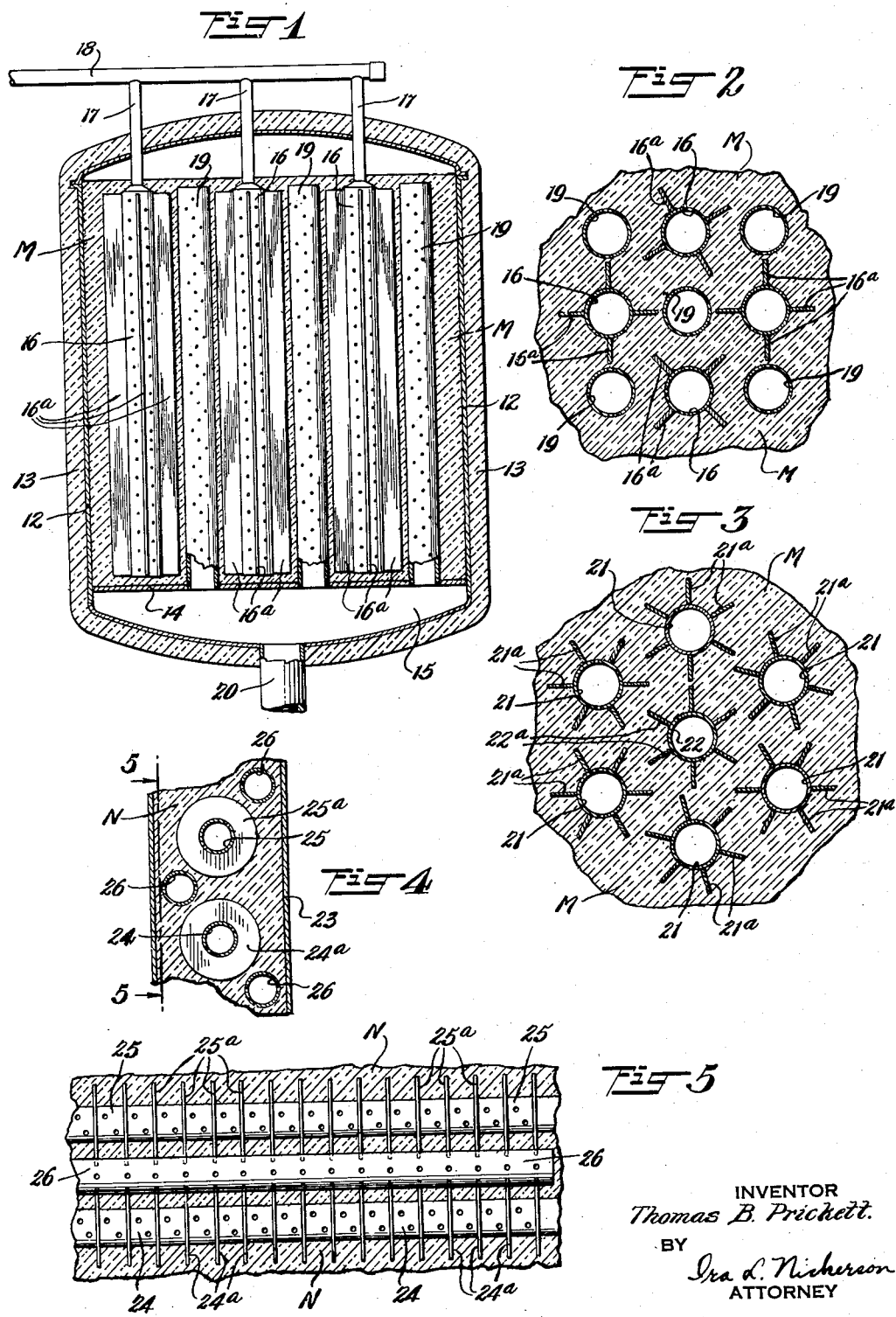

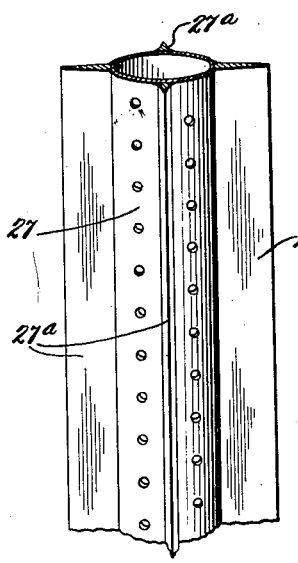
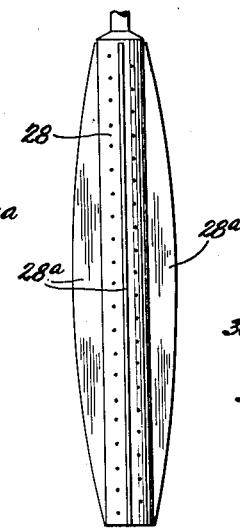
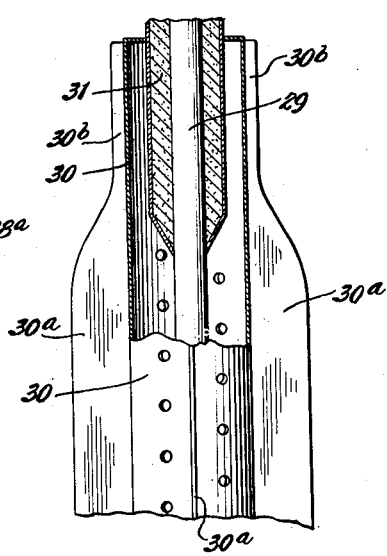
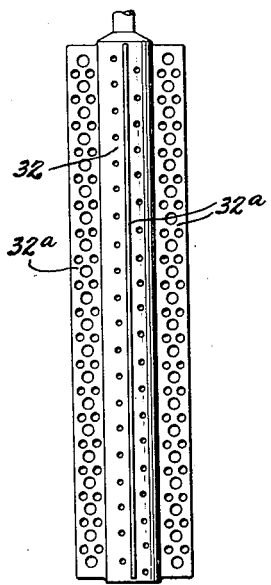
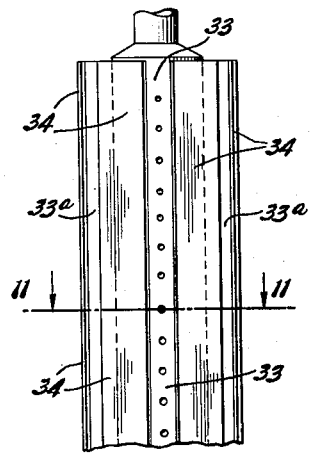
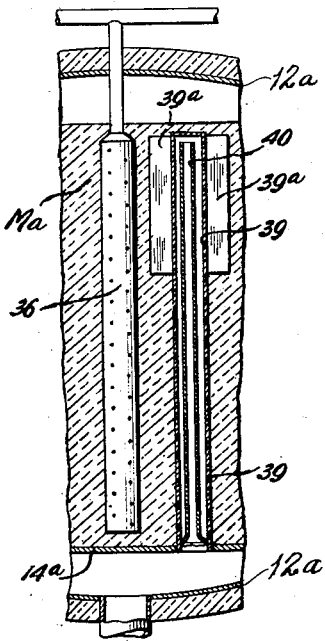
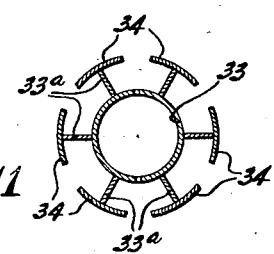

Patented Jan. 15, 1935

1,987,911

UNITED STATES PATENT OFFICE 1,987,911

TEMPERATURE REGULATION OF CONTACT MASSES

Thomas B. Prickett, Woodbury, N. J., assignor to Houdry Process Corporation, Dover, Del., a corporation of Delaware Application December 30, 1932, Serial No. 649,531

11 Claims. (Cl. 23—288)

This invention relates to heat exchange and to the regulation of temperatures especially in connection with the use of contact masses whether the same are inert to the material undergoing treatment or possess catalytic activity. The reactions to be controlled may be either exothermic or endothermic. In certain aspects the invention may be considered as an improvement on or further development of certain prior inventions relating to fluid conduits embedded in contact masses as in the copending application of Eugene J. Houdry, Serial No. 611,362, filed May 14, 1932.

It is well understood that the heat transfer within a contact mass involved in an exothermic or an endothermic reaction is made according to the general laws of radiation, conduction and convection. The conductivity of a catalytic or other contact mass is frequently poor, especially when it contains silicates in substantial amount or when inert, absorbent material is impregnated with substances having catalytic activity. On account of the high porosity of most contact masses and the constitution of the mass in small pieces in intimate contact with one another, convection is minimized especially when it is necessary to distribute gaseous materials throughout the mass. Radiation is limited by the fact that the reaction temperature ranges are often so narrow that the metal walls enclosing the mass and of any metallic conduits embedded therein must be maintained near the average temperature of the mass if a satisfactory reaction is to take place.

A principal object of the invention is to effect improved temperature regulation and control of contact masses both for exothermic and for endothermic reactions. Another object is to increase the quantity of fluid fed to or through the contact mass thereby to reduce the time of the reaction or to increase the yield. A further object is to reduce the time required for regenerating or reactivating a contact mass. Still another object is to reduce the number of distributing and/or outlet conduits for a reaction chamber. Still further objects will be apparent from the detailed description which follows.

The invention involves extending the area of contact between heat conducting members for the fluids and the contact mass. This may be accomplished in any desired manner, as by extensions or projections on some or all of the fluid conduits extending out into the mass to conduct heat out of or into the mass, depending upon the character of the reaction. A preferred arrangement involves the use of fins which may radiate from a conduit axially, transversely, spirally or in any other desired form. As a matter of convenience in inserting the catalyst after the reaction chamber is assembled, axial fins may be used when the conduits are vertically disposed within the reaction chamber, and transverse fins when the conduits are horizontally disposed, especially when the catalyst is in lump or molded form. If the catalyst is finely divided, practically any fin or other projection arrangement on the conduits may be used since the catalyst can be packed around the conduits by the use of the fluid carrier stream or by agitating or vibrating the reaction chamber. The invention further contemplates modifying the fins or other projecting means as to extent, form, thickness, etc., so as to take care of hot or cold areas or other normal or abnormal temperature irregularities within the contact mass.

In order to illustrate the invention, concrete embodiments thereof are shown in the accompanying drawings, in which:

Fig. 1 is a vertical sectional view through a cylindrical reaction case having both distributing and outlet conduits embedded in the contact mass;

Fig. 2 is a fragmentary horizontal sectional view of a portion of the interior of the reaction chamber shown in Fig. 1;

Fig. 3 is a horizontal sectional view similar to Fig. 2, but showing a different formation of conduits;

Fig. 4 is a vertical sectional view through a fragmentary portion of a flat rectangular reaction chamber;

Fig. 5 is a fragmentary vertical sectional view substantially on the line 5—5 of Fig. 4;

Figs. 6, 7, 8, 9 and 10 show modified forms of finned conduits;

Fig. 11 is a transverse sectional view substantially on the line 11—11 of Fig. 10; and Fig. 12 is a fragmentary view of a reaction case similar to that shown in Fig. 1, showing another modification of the invention.

Fig. 1 discloses a reaction case conforming in general to that shown in Fig. 3 of the aforesaid copending application, Serial No. 611,362. Case 12, preferably of metal and cylindrical in form, is surrounded with a thick layer of heat insulating material 13, and has therewithin, in spaced relation to its bottom, a partition or false bottom 14 which defines a chamber 15 therebelow and supports a contact mass M. Dependent upon the purpose of the reaction chamber and the products to be produced therein, contact mass M may be of inert, absorbent material, or may possess catalytic activity so as to be capable of effecting the desired modification, conversion or transformation of the starting material. Embedded in the mass are fluid conducting units serving to cool or to heat the mass, and in either case the heat exchange fluid may or may not be brought into direct contact with the mass. In the present instance, the fluid, such as the starting material, is uniformly distributed throughout contact mass M by a series of apertured conduits 16 embedded in the mass and having connections 17 which extend out through the top of case 12 to connect with an inlet header or manifold 18. The products of the reaction are withdrawn by a series of apertured conduits 19 mounted in partition 14 and extending into mass M in juxtaposed parallelism with the distributing conduits 16, so as to discharge such products into chamber 15 which has an outlet connection 20.

Some or all of the conduits have conducting means extending outwardly therefrom into mass M for facilitating and expediting the movement of heat into or away from the mass. Such projecting means preferably take the form of fins or flanges mounted on the exterior of the conduits and extending axially thereof or radiating therefrom in a transverse plane. In Figs. 1 to 3 inclusive, and 6 to 11 inclusive, the fins extend axially of the conduits, while in Figs. 4 and 5 they extend transversely.

In Figs. 1 and 2, distributing conduits 16 alone are provided with axial fins or flanges 16a, while the outlet conduits 19 are in the form of plain pipes. The square formation or disposition of the conduits illustrated in Fig. 2 permits exceptionally long fins on the distributing pipes 16 when there are no fins on the outlet pipes 19. This formation calls for an equal number of conduits of both series.

In Fig. 3, another arrangement is shown, in which inlet pipes 21 are in hexagonal arrangement around a single outlet conduit 22, this formation providing for twice as many inlet or distributing conduits as outlet conduits. Here the application of fins, such as 22a, to discharge conduits 22 does not limit the extent or projection of fins 21a applied to inlet pipes 21. Hence both series of conduits in this figure are equipped with heat conducting means extending out into the contact mass.

Fig. 4 indicates one arrangement for a flat rectangular reaction case 23 having conduits 24 and 25 entering through one or both ends thereof, so as to extend horizontally therewithin. To permit contact mass N to be inserted by gravity, fins 24a and 25a may be applied to their respective conduits in the form of either transverse or spiral flanges. Either of the conduits may be used for the inlet, while the other is used for the outlet. If both conduits are used as inlet distributing means, additional outlet conduits 26 may be provided.

Any number of conducting fins per conduit may be used, and they may be of any shape and extend within the limits permitted by associated conduits or the walls of the reaction chamber. Furthermore, the fins may be arranged to suit special conditions and to conform to the structure of special conduit units for effecting temperature regulation under difficult conditions, as will be apparent from the modifications illustrated in the remaining figures of the drawings. In general, the shape and dimensions of the fins will be varied according to the amount of heat which is sought to be transferred.

For example, Fig. 6 discloses a fluid conduit 27 having fins 27a, varying in thickness, as tapered in cross-section. The taper of the fins is outwardly from the conduit, to provide increased heat conduction capacity as the conduit is approached, but the taper may be reversely arranged to provide a thick fin with an increased area of contact at a distance from the conduit and decreasing conductivity as the conduit is approached. In Fig. 7, conduit 28 has fins 28a, which are irregular in extent or projection, as tapering or decreasing in an axial direction from a maximum projection from a predetermined point on the conduit. Such an arrangement may be used when an inner portion of the reaction chamber tends to remain hotter or colder than the upper and lower portions of the mass. If still less heat is to be imparted to or withdrawn from certain portions of the mass, the fins may be further reduced in projection or width, or shortened as to extent or length, or both. When fins of less extent than the conduit are used, they may be applied to any part or parts of the latter.

Fig. 8 discloses an application of the invention to a distributing element of the double or nested conduit type disclosed in the copending application of myself and Eugene J. Houdry, Serial No. 612,222, filed May 19, 1932, and in the copending application of James W. Harrison, Serial No. 630,262, filed August 24, 1932. The open end of inner conduit 29 is disposed adjacent the lower closed end of outer conduit 30, and at the upper end of the distributing unit the space between the two conduits is partly taken up by a layer of heat insulating material 31 surrounding the inner conduit to check transfer of heat by radiation between the conduits. Such a unit would be used in a reaction chamber which tends to run cold at its upper portion and in order to assist in the checking of heat transfer at this point the heat conducting fins 30a applied to outer conduit 30 would have a zone of decreased projection or width 30b conforming to the extent of the heat insulating layer 31. In this way the amount of the fins and the amount of interior insulation may be balanced, if desired, so as to effect an equal heat transfer throughout the length of the fluid conducting unit.

In the form of the invention shown in Fig. 9, the fins 32a applied to conduit 32 are apertured or perforated to reduce weight and to allow circulation of fluid around and through the fins. Reticulated metallic mesh or screening suitably secured in heat conducting relation to conduit 32 may be utilized to form fins 32a.

One way of securing still greater heat exchange between the contact mass and a fluid conduit is illustrated in Figs. 10 and 11, wherein plates 34 are disposed in spaced relation to conduit 33 and to each other and are connected to the conduit by heat conducting webs or fins 33a. If desired, plates 34 may be initially integral with fins 33a by using suitable standard metal shapes, or by making the fins of greater width or projection than needed and bending the same so that the excess part of each fin forms plate 34.

Fig. 12 shows a practical application of the invention to a reaction case 12a similar to case 12 of Fig. 1, having a series of apertured distributor conduits such as 36 extending through the top of the case into a contact mass Ma, and a series of outlet conduits such as 39 extending upwardly from a false bottom 14a. With fluids passing in parallel through contact mass Ma from the apertures in the distributor conduits 36 to the nearest apertures in the outlet conduits 39, it will be obvious that the fluids enter the outlet conduits at the temperature of the reaction. A sectional view just below the top head of Fig. 12 would be similar to Fig. 2, except that the fins would extend from the discharge conduits and not from the distributing conduits. By preference, distributing conduits 36 are of the nested conduit type with heat baffling means adjacent their upper ends, after the manner indicated in Fig. 8, but without fins. Now assuming that a part of the contact mass, such as the top, tends to remain too cool due to loss of heat by radiation and conduction at the upper part of the reaction chamber, the invention may be applied in such a way as to counteract this effect. For this purpose, the apertured outlet conduit 39 may have an imperforate inner conduit 40 with its open end adjacent the top of outer conduit 39. This will compel all of the fluid entering the space between conduit 39 and inner conduit 40 to pass to the top of conduit 39 before it can leave through the inner conduit 40, and the heat of the reaction throughout the depth of the reaction chamber will be brought by the discharging fluid to the upper part of the chamber. This heat may then be transmitted directly into the contact mass at the top of the reaction chamber by fins 39a on the exterior of outer conduit 39. The fins, as shown, extend axially of the conduit near the open end of inner conduit 40 and only for a sufficient distance from the upper end thereof to counteract the tendency of this portion of the mass to fall below the reaction temperature. By suitably positioning the fins on the outer conduit, and by making the inner pipe 40 of predetermined length, it is possible to use the heat contained in the fluids leaving the contact mass to keep any particular part of the mass at the desired temperature, since the fins projecting from the outer conduit will diffuse the heat through the mass.

I claim as my invention:

1. In combination, a case containing a contact mass, a series of apertured fluid distributing conduits embedded in said mass, a series of outlet conduits also embedded in said mass, and heat conducting members radiating from the conduits of one only of said series to control the movement of fluid between said series and to facilitate exchange of heat with said mass.

2. In combination, a case containing a contact mass, a series of apertured fluid distributing conduits embedded in said mass, a series of outlet conduits also embedded in said mass, and heat conducting members radiating from the conduits of said distributing series only thereby to control the movement of fluid and to improve the heat exchange between said mass and said distributing conduits.

3. In combination, a case containing contact mass, a series of fluid distributing and outlet conduits embedded in said mass in parallelism with each other and in symmetrical formation, and a plurality of fins radiating from the conduits of one only of said series into said mass to limit the movement of fluid between said conduits and to increase the heat exchange between said mass and said last named one of said series.

4. In combination, a case containing contact mass, a series of fluid distributing and outlet conduits embedded in said mass in parallelism with each other and in symmetrical formation, and a plurality of axial fins on the conduits of one only of said series for guiding the movement of fluid between said series of conduits and for increasing the heat exchange between said mass and said last named one of said series.

5. In combination, a case containing a contact mass, a series of fluid distributing and outlet conduits embedded in said mass in parallelism with each other and in symmetrical formation, and axial fins disposed symmetrically on certain of said conduits and extending therefrom into said mass, said fins varying in extension in different parts of said case.

6. In combination, a case containing a contact mass, a distributing conduit and an outlet conduit embedded in said mass in spaced parallelism with each other, each conduit having a series of apertures to provide for movement of fluid from one conduit to the other in parallel planes, said outlet conduit having means for concentrating the heat of the discharge fluids at a predetermined point and for diffusing such heat into the adjacent portions of said contact mass.

7. In combination, a case containing a contact mass, a distributing conduit and an outlet conduit embedded in said mass in spaced parallelism with each other, each conduit having a series of apertures to provide for movement of fluid from one conduit to the other in parallel planes, said outlet conduit being of the double conduit type with an inner member forcing all of the discharge fluids to pass to one end of said outlet conduit thereby to concentrate the heat of said fluids at said end, and conducting means projecting from said outlet conduit at said end into said mass to diffuse such concentrated heat into the adjacent portions of said mass.

8. In combination, a case containing a contact mass, a distributing conduit and an outlet conduit embedded in said mass in spaced parallelism with each other, each conduit having a series of apertures to provide for movement of fluid from one conduit to the other in parallel planes, said outlet conduit being of the double conduit type with an inner member forcing all of the discharge fluids to pass to one end of said outlet conduit thereby to concentrate the heat of said fluids at said end, and fins extending from said end of said outlet conduit into said mass to diffuse therein said concentrated heat.

9. A combined heat exchange and fluid conducting unit adapted to be embedded in a contact mass comprising inner and outer conduits in nested arrangement, and heat baffling means associated with said inner conduit and heat conducting means associated with said outer conduit to effect a balanced or equal transfer of heat throughout the length of said unit.

10. A combined heat exchange and fluid conducting unit adapted to be embedded in a contact mass comprising inner and outer conduits in nested arrangement, heat baffling means enclosing a portion of said inner conduit, and heat conducting members projecting from the exterior of said outer conduit, said means and said members being proportioned and arranged to effect a predetermined balance of heat exchange throughout the length of said unit.

11. A combined heat exchange and fluid conducting unit adapted to be embedded in a contact mass comprising inner and outer conduits in nested arrangement, heat insulating means enclosing a portion of said inner conduit, and fins projecting from the exterior of said outer conduit, said fins being of reduced projection or width in the zone of said heat insulating means.

THOMAS B. PRICKETT.

CERTIFICATE OF CORRECTION.

Patent No. 1,987,911. January 15, 1935.

THOMAS B. PRICKETT.

It is hereby certified that error appears in the printed specification of the above numbered patent requiring correction as follows: Page 3, first column, lines 55 and 63, claims 1 and 2 respectively, after the word "of " insert the words apertured fluid; and that the said Letters Patent should be read with these corrections therein that the same may conform to the record of the case in the Patent Office.

Signed and sealed this 12th day of March, A. D. 1935.

Leslie Frazer (Seal) Acting Commissioner of Patents.